Sept. 9, 1941.  C. M. JOHNSON  2,255,172
COMBINED UNIVERSAL JOINT AND BEARING
Filed Feb. 1, 1940
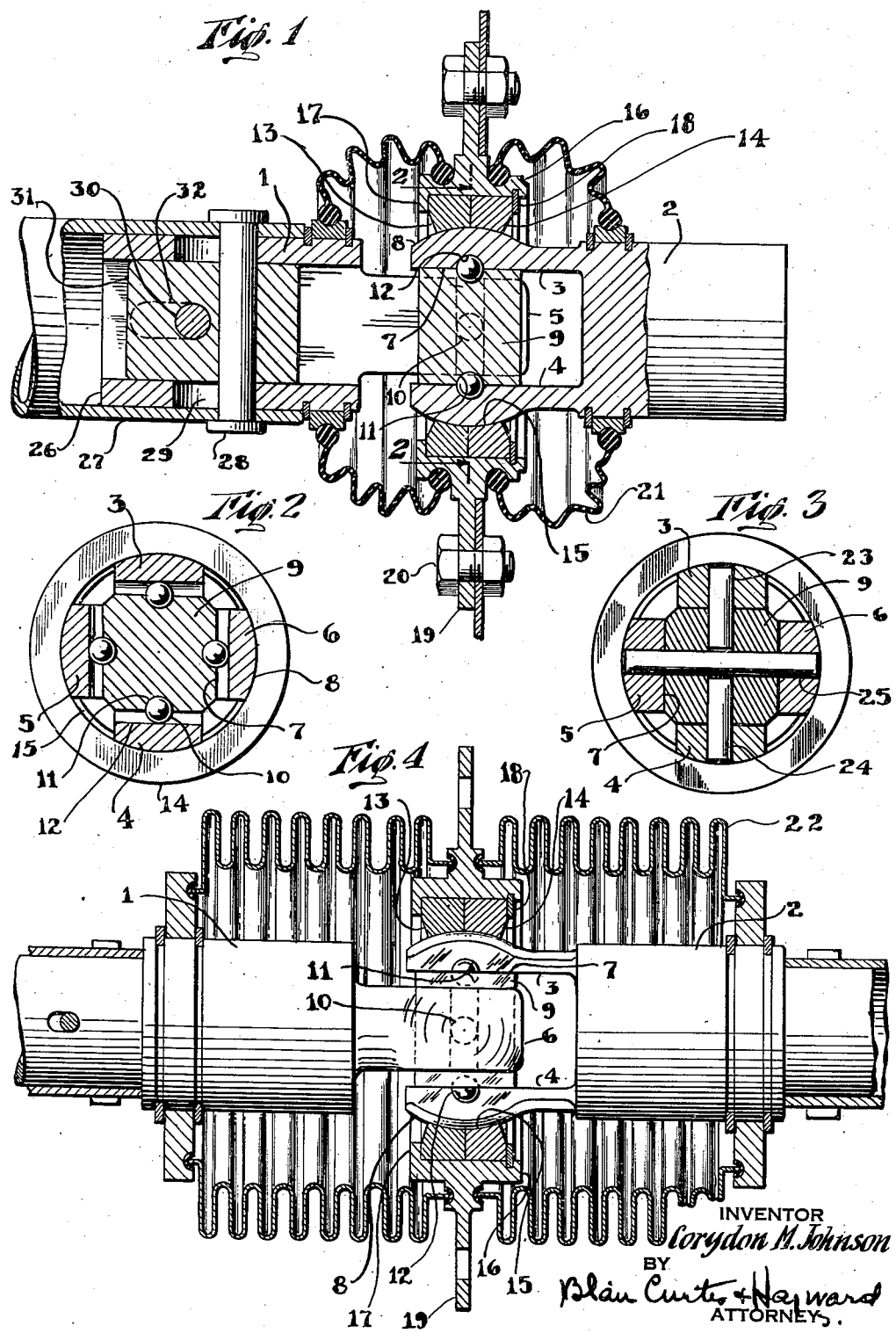
INVENTOR
Corydon M. Johnson
BY
Blair Curtis & Hayward
ATTORNEYS.

Patented Sept. 9, 1941

2,255,172

UNITED STATES PATENT OFFICE 2,255,172

COMBINED UNIVERSAL JOINT AND BEARING

Corydon M. Johnson, Freeport, N. Y.

Application February 1, 1940, Serial No. 316,796

5 Claims. (Cl. 64—17)

This invention relates to a combined universal joint and bearing for an articulated shaft assembly.

An object of the invention resides in a device of this character wherein the bearing for the shaft will serve to hold the component parts of the universal joint in the assembled relationship.

Other objects of the invention will appear as the description progresses.

In the drawing:

Figure 1 is a sectional view of the assembly showing the same adapted for use where it is not subjected to submersion in liquids as for instance in airplane controls;

Figure 2 is a cross section through the universal joint on line 2—2 of Figure 1;

Figure 3 is a section through a modification of the universal joint; and

Figure 4 is an elevation, partly in section, of the assembly showing the same adapted for use where it is subjected to submersion in liquid as for instance in marine work.

The form of the invention illustrated in Figures 1, 2 and 4 includes articulated shaft sections 1 and 2. The end of each section is bifurcated forming forked bearing elements 3, 4, 5 and 6 having inside faces 7 and convex outside faces 8.

Between the bearing elements 3, 4, 5 and 6 a block 9 is located which block has faces complemental to the faces 7.

Ball bearings 10 are located between the faces 7 and the complemental faces of the block 9. These ball bearings are located in semi-spherical seats 11, in the block 9, and in slots 12 in the bearing elements 3, 4, 5 and 6. Of course the order here may be reversed, i. e., the slots may be in the block and the seats in the bearing members.

The manner of assembling the universal joint is this: The ball bearings 11 are placed in their seats and the bearing members slipped laterally over them into their final positions, the ball bearings riding in the slots 12.

In order that the thus engaged ends of the shaft sections may be held in this assembled relation for universal movement, and a bearing member therefor provided, I contemplate the use of a bearing member which includes two rings 13 and 14 which have concave faces 15 complemental to and cooperating with the convex faces 8 of the bearing members 3, 4, 5 and 6.

These rings 13 and 14 are mounted within a frame 16 that is provided with a permanent annular flange 17 at one side and a removable flange 18 at the other side, which latter may be applied and secured by any of the well known methods.

The frame may be provided with a flange 19 by means of which it may be secured to a support such as a bulkhead by means of fasteners such as bolts 20.

In assembling, the rings 13 and 14 are slipped over the bearing members 3, 4, 5 and 6, and within the frame 16, and are locked therein by the flange or lock ring 18.

When the device is to be used in locations where it is not likely to be subjected to submersion or any considerable amount of liquid, a bellows 21 of rubber or the like may be used to confine a lubricant around the universal joint and bearing.

A similar bellows 22 but of metal which is so formed as to be expansible may be mounted as shown in Figure 4 when the device is to be submerged in or subjected to any considerable amount of fluid. Here again the bellows may be used to confine a lubricant.

In the modification shown in Figure 3 I have substituted pins 23, 24 and 25. In assembling the pin 25 is preferably inserted in a receiving opening in the block 9 and the bearing members 5 and 6 and pins 23 and 24 are then inserted in receiving openings in the block 9 and the bearing members 3 and 4. The remainder of the device is then assembled as before described.

If desired, one or both of the shaft sections may be constructed as shown in Figure 1 wherein two tubular sections 26 and 27 are telescopically assembled and held in sliding engagement but against relative rotation by a pin 28 that is in fixed relation to the section 27 and extends through the slots 29 in the section 26. A second pin 30 is in fixed relation to a plug 31 and is slidable in slots 32 in the section 26. The pin 28 is also fixed in relation to the plug 31.

While I have illustrated and described a particular form of my device it is to be understood that many changes therein may be made without departing from the claims.

What I claim is:

1. A combined universal joint and bearing including shaft sections having forked ends, a block disposed between said forked ends, pins loosely engaged with the forked ends and block to hold the same together, and a bearing member surrounding the forked ends and in which the same are adapted to rotate, which bearing member is adapted to prevent the displacement of the pins.

2. In a combined universal joint and bearing including shaft sections having forked ends, a block disposed between said forked ends, ball bearings disposed between the block and the inner surfaces of the forked ends, and a bearing member surrounding the forked ends and in which the latter are adapted to rotate, arranged to prevent the relative displacement of the ball bearings and the forked ends.

3. A combined universal joint and bearing including shaft sections having forked ends, a block disposed between said forked ends, the diameter of the block being less than the distance between the members of the fork on each of said shafts, ball bearings seated in the block and engaging the inner faces of the members of the forks, and a bearing surrounding the forked ends to permit the said forked ends to move pivotally on the ball bearings but to prevent relative lateral movement of the block and forked ends of the shaft sections.

4. A combined universal joint and bearing including shaft sections having forked ends, a block disposed between said forked ends, said forked ends and block having aligned openings arranged at right angles to each other, a pin extending through the aligned openings in one direction, and a pair of pins extending through the aligned openings of the forked ends and into the aligned openings in the block in the other direction, said pins being loosely mounted in said openings, and a bearing member for said forked ends arranged to prevent the displacement of said pins in said openings.

5. A combined universal joint and bearing including shaft sections having forked ends, a block between said forked ends, said forked ends and block having complemental recesses therein, retaining elements loosely mounted in said complemental recesses, and a locking ring surrounding the forked ends to prevent the displacement of the retaining elements from the complemental recesses and to support the universal joint.

CORYDON M. JOHNSON.